(12) United States Patent
Ferreira et al.

(10) Patent No.: US 10,046,868 B2
(45) Date of Patent: Aug. 14, 2018

(54) DEVICE FOR CONTROLLING THE SPEED OF A SPACEPLANE DURING THE TRANSITION FROM A PHASE OF SPACE FLIGHT TO A PHASE OF AERONAUTICAL FLIGHT AND ASSOCIATED TRANSITION METHOD

(71) Applicant: AIRBUS DEFENCE AND SPACE SAS, Les Mureaux (FR)

(72) Inventors: Eugénio Ferreira, Paris (FR); Angélique Santerre, Listrac-medoc (FR); Benjamin Faure, Le Bouscat (FR); Samuel Chevrollier, Tarbes (FR); Pierre Parpaite, Saint Martin (FR); Christophe Favre, Lau Balagnas (FR)

(73) Assignee: AIRBUS DEFENCE AND SPACE SAS (FR)

( * ) Notice: Subject to any disclaimer, the term of this patent is extended or adjusted under 35 U.S.C. 154(b) by 184 days.

(21) Appl. No.: 14/781,938

(22) PCT Filed: Mar. 28, 2014

(86) PCT No.: PCT/EP2014/056349
§ 371 (c)(1),
(2) Date: Oct. 2, 2015

(87) PCT Pub. No.: WO2014/161794
PCT Pub. Date: Oct. 9, 2014

(65) Prior Publication Data
US 2016/0052650 A1      Feb. 25, 2016

(30) Foreign Application Priority Data

Apr. 5, 2013   (FR) ...................................... 13 53088

(51) Int. Cl.
*B64G 1/62*          (2006.01)
*B64C 9/32*          (2006.01)
(Continued)

(52) U.S. Cl.
CPC ................ *B64G 1/62* (2013.01); *B64C 9/323* (2013.01); *B64C 25/10* (2013.01); *B64G 1/14* (2013.01); *B64C 25/16* (2013.01); *Y02T 50/32* (2013.01)

(58) Field of Classification Search
CPC ........... B64C 25/16; B64C 9/32; B64C 9/323; B64C 9/326; B64G 1/14; B64G 1/62
See application file for complete search history.

(56) References Cited

U.S. PATENT DOCUMENTS 3,289,974 A * 12/1966 Cohen ...................... B64D 5/00
                                                    102/291
3,390,853 A *  7/1968 Wykes ...................... B64C 3/40
                                                    244/1 R
(Continued)

FOREIGN PATENT DOCUMENTS

FR          2924411          6/2009
JP         2001206298        7/2001
(Continued)

OTHER PUBLICATIONS

International Search Report, International Application No. PCT/EP2014/056349, dated Jul. 23, 2014.

*Primary Examiner* — Philip J Bonzell
*Assistant Examiner* — Michael B Kreiner
(74) *Attorney, Agent, or Firm* — Perman & Green, LLP

(57) ABSTRACT

A spaceplane suitable for aeronautical flight comprising a body and a wing defining a lower airfoil surface in addition to attitude control means that comprise one or a plurality of shutters disposed under the lower airfoil surface of same and (Continued)

maneuverable between a stowed position and an inclined extended position for aerodynamic braking during the transition from a phase of space flight to a phase of aeronautical flight of the aircraft.

16 Claims, 2 Drawing Sheets

(51) Int. Cl.
  *B64G 1/14* (2006.01)
  *B64C 25/10* (2006.01)
  *B64C 25/16* (2006.01)

(56) References Cited

U.S. PATENT DOCUMENTS

| | | | | |
|---|---|---|---|---|
| 3,485,465 | A | * | 12/1969 | Churchill ............... B64C 25/10 244/102 R |
| 3,511,453 | A | * | 5/1970 | Giragosian ............. B64G 1/62 244/164 |
| 6,735,842 | B1 | * | 5/2004 | Wildenrotter ........... B64C 1/38 29/525.01 |
| 7,229,048 | B1 | * | 6/2007 | August .................... B64G 1/62 244/158.7 |
| 7,611,095 | B1 | * | 11/2009 | Alban, III ............... B64C 9/34 244/158.7 |
| 8,528,853 | B2 | * | 9/2013 | Luther .................... B64C 1/00 244/158.1 |
| 8,844,876 | B2 | * | 9/2014 | Prampolini .............. B64G 1/62 244/158.9 |
| 9,073,647 | B2 | * | 7/2015 | Helou, Jr. ............... B64G 1/14 |
| 2005/0230529 | A1 | | 10/2005 | Towne |
| 2007/0068138 | A1 | | 3/2007 | Sheerin |
| 2010/0096491 | A1 | * | 4/2010 | Whitelaw ................ A63K 3/00 244/15 |
| 2010/0327108 | A1 | | 12/2010 | Prampolini |
| 2012/0025006 | A1 | * | 2/2012 | Luther .................... B64C 1/00 244/2 |

FOREIGN PATENT DOCUMENTS

| | | |
|---|---|---|
| WO | 0043267 | 7/2000 |
| WO | 2007002243 | 1/2007 |

* cited by examiner

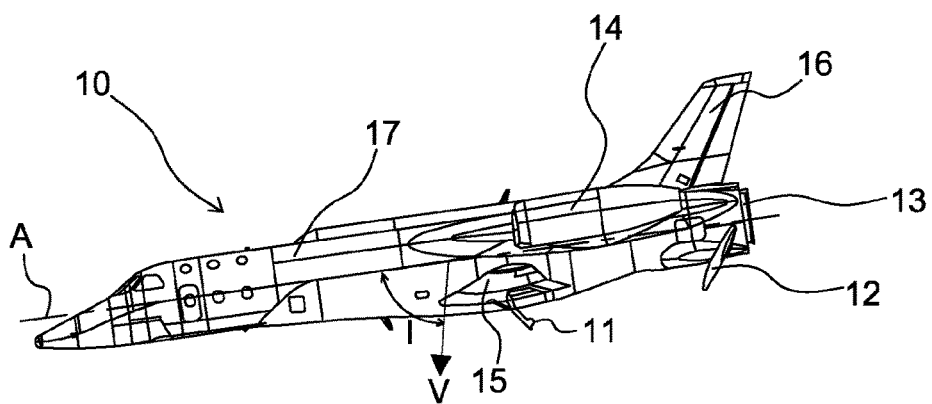
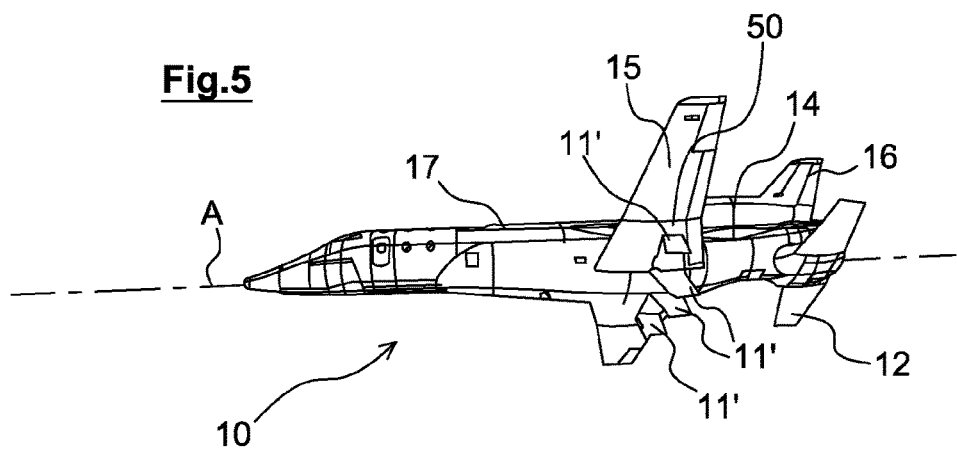

DEVICE FOR CONTROLLING THE SPEED OF A SPACEPLANE DURING THE TRANSITION FROM A PHASE OF SPACE FLIGHT TO A PHASE OF AERONAUTICAL FLIGHT AND ASSOCIATED TRANSITION METHOD

CROSS REFERENCE TO RELATED APPLICATIONS

This application is the National Stage of International Application No. PCT/EP2014/056349, having an International Filing date of 28 Mar. 2014, which designated the United States of America, and which International Application was published under PCT Article 21(s) as WO Publication No. 2014/161794 A1, and which claims priority from, and the benefit of French Application No. 1353088, filed 5 Apr. 2013, the disclosures of which are incorporated herein by reference in their entireties.

BACKGROUND

1. Field

The disclosed embodiment relates to a device for controlling the speed of an aerospace craft, notably of the space plane type, during the transition of this craft from a phase of space flight to a phase of aeronautical flight, and relates to an associated transition method.

A space plane is an aeronautical spacecraft suited to aeronautical flight and for that purpose comprising lift-generating surfaces. As a spacecraft it comprises, for example, a rocket motor and means suited to controlling it in the absence of air or other supporting gas.

One set of problems with such a craft is its reentry into the atmosphere and, in particular, the transition from a ballistic or lift-free type of flight to aeronautical flight for which the craft uses the lift offered by the atmosphere.

For a space plane, one particular constraint is that it is necessary to limit the loads and accelerations experienced by the structure and passengers of the craft to low values in comparison, for example, with craft the crew of which is made up of trained astronauts such as the space shuttle formerly operated by NASA.

2. Brief Description of Related Developments

By way of braking devices for conventional atmospheric airplanes, there are airbrakes positioned above the wings or on the upper part of the fuselage.

Further, in the context of atmospheric airplanes, there are braking systems that use landing gear doors, as known on the American military airplane F-111.

However, the use of such devices in the field of space does not exist.

These days, in order for a space plane or space shuttle to make the transition from space flight to aeronautical flight, it brakes by pressing its underside down on the air, thereby increasing the drag of the craft. The space plane is braked in this way and loses altitude.

In the case of the American space shuttle, this braking causes significant heating and the crew experience G-forces corresponding to the strength of the ensuing deceleration.

SUMMARY

It is an object of the disclosed embodiment to propose a device for controlling the speed of a craft such as a space plane during the transition from a phase of space flight to a phase of aeronautical flight that is suited to allowing the plane to have a braking phase and to return to aeronautical flight with reduced loadings and deceleration.

As was seen earlier, a space plane is an aircraft capable of aeronautical flight and capable of space flight.

In space flight, the craft may describe an orbit around the Earth, orbital flight for example, or may simply have a course in the form of a parabolic arc notably for a suborbital flight, with a maximum altitude of a few tens to a few hundreds of kilometers. In both cases, the return to a phase of aeronautical flight entails control of the speed of the plane so as to limit the loadings applied to this plane and to its passengers.

In order to achieve this, the disclosed embodiment proposes a spacecraft suited to aeronautical flight comprising a body and a wing structure defining a lift-generating surface, and attitude-control means, said aircraft comprising one or more flaps positioned under its lift-generating surface and that can be maneuvered between a retracted position and an inclined, deployed, aerodynamic-braking position during the transition of the craft from a phase of space flight to a phase of aeronautical flight.

For preference, the flap or flaps are suited to deployment at controllable variable inclinations.

Advantageously, the craft comprises at least one pair of flaps which are positioned on either side of a longitudinal axis of the craft.

According to one particular aspect, the flaps are suited to being controlled independently of one another so as to control the descent of the craft.

According to one advantageous aspect, all or some of the flaps are airbrake devices/landing gear doors.

Advantageously, the flaps can be maneuvered according to the phases of flight independently of the landing gears or in conjunction with the landing gears.

According to one particular aspect, the flaps comprise a first axis of maneuvering for opening the flaps against the eye of the wind, the flaps then operating as airbrakes, and an axis of maneuvering for opening the flaps parallel to the eye of the wind, the flaps then operating as landing gear doors.

The airbrake flaps/landing gear doors are preferably maneuvered by actuators rated to allow the airbrakes to be opened partially during the transition between space descent and aeronautical descent and to allow the landing gear doors to be opened fully for landing, the actuators being suited to opening the flaps in a way that can be altered according to the phase of flight.

According to one particular aspect, the attitude-control means comprise pitch-attitude control surfaces.

The disclosed embodiment also relates to a method for controlling the speed of an aircraft during a descent phase of the aircraft with transition of the aircraft from a phase of space flight to a phase of aeronautical flight, this descent phase comprising:
- a first step of parabolical descent of the aircraft, the aircraft being in a position of high incidence;
- a second step of bringing the craft into a nose-down position; and
- a third step of the aircraft flattening out in aerodynamic flight at low incidence;
for which control of the speed of the aircraft is achieved at least in the second step by means of the opening of said flaps.

The high-incidence position is notably defined by an angle greater than 40° between the longitudinal axis and the speed axis of the craft.

According to one particular aspect, the control of the speed of the craft by the opening of said flaps is begun during the first step.

With the means of controlling the attitude of the aircraft comprising pitch-attitude control surfaces, these are preferably angled so as to apply a nose-up moment to the craft during the first step.

The transition from the first to the second step occurs advantageously through the straightening of the pitch-attitude control surfaces, the opening of the flaps controlling the speed of the aircraft.

With the aircraft having created lift at the end of the second step, the flattening-out step is preferably performed by angling the pitch-attitude control surfaces in such a way as to apply a nose-up moment to the aircraft, the flaps then being closed again.

According to one advantageous aspect, the transition from the space domain to the aeronautical domain of a space plane of the disclosed embodiment comprising landing gear doors suited to operating as airbrake flaps involves:

- a first step of angling the pitch-attitude control surfaces in such a way as to apply a nose-up moment to the aircraft, the space plane having a speed V that is practically vertical with high incidence I, the space plane being kept substantially horizontal;
- a second step of opening the landing gear doors and of straightening the pitch-attitude control surface, the space plane thus being brought into a nose-down configuration, the speed V of the space plane being practically vertical with low incidence I;
- a third step of angling the pitch-attitude control surfaces in such a way as to apply a nose-up moment to the aircraft and of closing the landing gear doors, for which step the space plane reverts to aeronautical operation, the space plane and the speed V being returned to the horizontal, said plane being at a low incidence I.

BRIEF DESCRIPTION OF THE DRAWINGS

The disclosed embodiment will be better understood from reading the following description of one non-limiting exemplary aspects of the disclosed embodiment and from studying the accompanying drawings. These drawings are given merely by way of non-limiting illustration of the disclosed embodiment and depict:

FIG. 1 is a view of a craft of the space plane type according to the disclosed embodiment;

FIG. 5 is an enlarged view of the space plane of FIG. 1; in the final configuration prior to landing with the landing gear doors of the wing structure in the position in which they open the landing gear bay according to one particular aspect of the disclosed embodiment.

DETAILED DESCRIPTION

Figure 2:
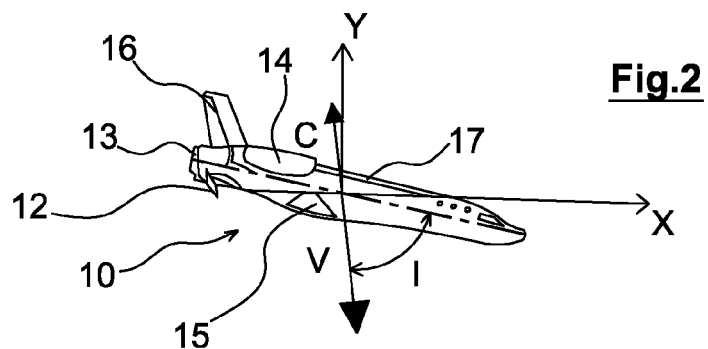
FIG. 2 is a first phase of space descent of the space plane of FIG. 1.

As was seen above, it is an object of the disclosed embodiment to propose a device for controlling the speed of, and for limiting the induced loadings on, an aerospace craft such as a space plane 10 during a transition from a phase of space flight to a phase of aeronautical flight.

The disclosed embodiment applies for example to a space plane 10 as depicted in FIG. 1 comprises a fuselage 17, a wing structure consisting of wings 15, control surfaces 12, a rudder 16, engines operating in aeronautical flight such as jet engines 14, and a rocket motor 13.

The phase of space or ballistic flight is illustrated in FIG. 2. This is a phase of flight in which the wing structure of the aircraft generates no lift because of the lack of air, the incidence of the aircraft furthermore being such that the lift-generating surfaces are in any event in a stalling configuration.

Figure 4:
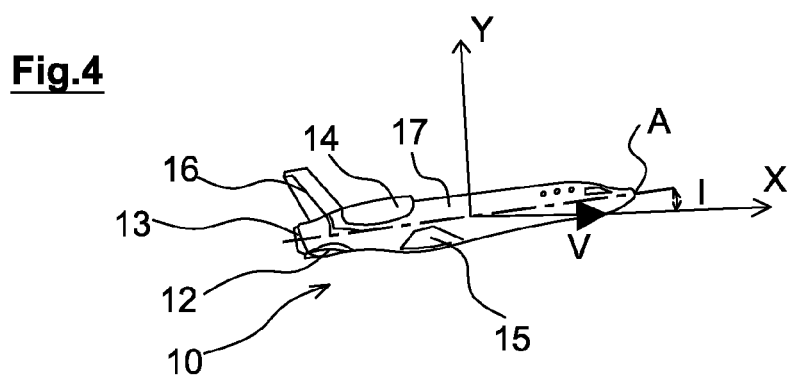
FIG. 4 is a phase of atmospheric flight of the space plane of FIG. 1.

The phase of aeronautical flight is illustrated in FIG. 4 and, in this phase, the aircraft flies traditionally, supported by its wing structure.

To make the transition from the phase of space or ballistic flight to the phase of aeronautical flight, according to one aspect of the disclosed embodiment, a transition occurs that uses a nose-down step as illustrated in FIG. 4.

In order for it to return, a space plane 10 needs to make a transition between space flight and aeronautical flight, see FIG. 4. Furthermore, it needs to brake considerably and control its speed throughout the transition between this phase of space flight and the phase of aeronautical flight.

In the phase of space flight, the craft brakes by friction against the atmosphere. To do that, it is in an attitude of very high incidence, greater than 40° or even at around 70° of incidence with a speed vector that is practically vertical.

In this situation, the craft does not strictly speaking fly because its main wing structure is in a state of permanent stall.

The solution adopted in the presently disclosed embodiment for making the transition from the phase of space flight to a phase of aeronautical flight supported by the wing structure of the craft is to have the aircraft adopt a nose-down configuration so that its incidence is decreased without needing to change its speed vector.

The nosing-down must, however, be controlled in order to keep the aircraft in a reasonable speed, acceleration and load configuration.

In order to do this, the space plane 10 according to the disclosed embodiment comprises flaps 11 operating as airbrakes suited to braking it in a flight transition in which it is not yet in aeronautical flight, and controlling its speed V during this transition.

The flaps 11 depicted notably in FIG. 1 are positioned under the wings and/or under the fuselage of the craft and can be maneuvered between a retracted position and a deployed aerodynamic-braking position.

In the space descent phase according to FIG. 2, the space plane 10 has its flaps 11 closed and its pitch-attitude control surfaces 12 angled in such a way as to apply a nose-up moment to the craft. The space plane 10 is therefore almost horizontal. Its incidence I, the angle between the plane longitudinal axis A and the speed vector, is preferably greater than 40° and may even lie between 70° and 90° with respect to its speed V, which is itself near vertical. Thus, the air resistance is high and the drag is maximized. The objective is to limit the accelerations experienced by the passengers, the pilot and the space plane 10. Because of the high incidence, the main wing structure 15 is stalled.

Stall is characterized by an abrupt loss of lift of the wing structure of an aircraft; the plane is no longer supported and drops.

During the stall, the plane noses down and rapidly loses altitude, this being the mode employed for space descent although the stall here is due to the fact that at the start of the descent phase the air is too rarefied to support the craft which furthermore from the outset is in a position with too high an incidence for its wings to be able to generate lift.

The control surfaces in the eye of the wind however are not stalled.

Figure 3:
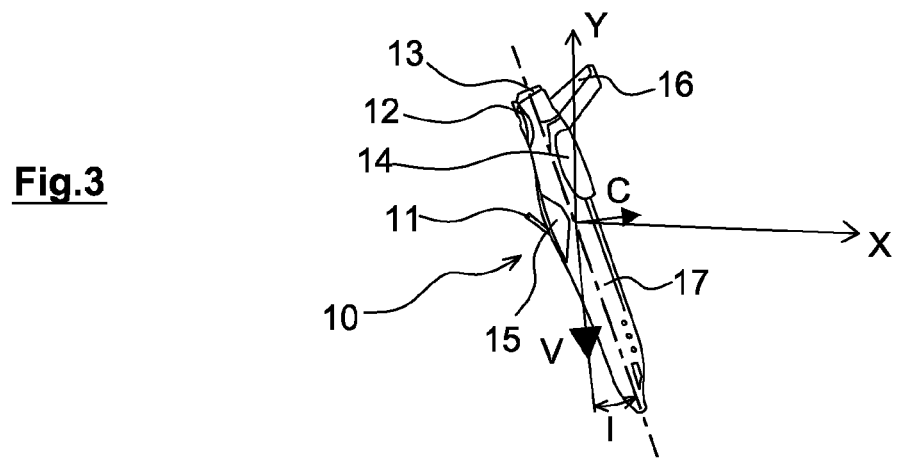
FIG. 3 is a transition phase of the space plane of FIG. 1.

According to FIG. 3, in order to realign the longitudinal axis of the plane and the axis of the speed V in order to revert to aeronautical flight, the space plane 10 adopts a nose-down attitude.

To do that, use is made of a mobile surface capable of orienting itself in the eye of the wind, this surface consisting of the pitch-attitude control surfaces of the craft which are maneuvered to angle the aircraft into a nose-down attitude.

According to the aspect, the control surfaces are ideally a horizontal plane fully able to move about an axis of maneuvering.

In this case, the commands to pull up the nose of the aircraft correspond to a rotation of the control surfaces about their axis in one direction so that their leading edge is lowered and their trailing edge is raised, which in this application is referred to by the expression angling to nose-up or angling to apply a nose-up moment.

The commands to nose-down themselves correspond to a rotation of the control surfaces such that their leading edge is raised and their trailing edge is lowered, which here is referred to as angling the control surfaces to nose-down or angling the control surfaces to apply a nose-down moment, and also, when the control surfaces are returned to a neutral position, this will be referred to here as straightening the control surfaces.

The pitch-attitude control surfaces are then used throughout the nose-down dive to ensure the stability of the space plane 10 by providing nose-down or nose-up compensation according to the variations in attitude of the aircraft.

It should be noted that, before the nose-down dive, during the phase of space flight, the control surfaces 12 are already oriented in the eye of the wind and therefore in a nose-up position so that they have lift and can be used to maneuver the aircraft and control the attitude thereof.

When the space plane 10 makes the nose-down dive, FIG. 3, its speed V increases appreciably and rapidly. This increase in speed V needs to be controlled and limited in order to allow an effective pull-up maneuver but also so that the craft remains in a Mach domain consistent with the domain in which the lift generated by the wing structure is optimal.

The Mach number expresses the ratio of the local speed of a fluid to the speed of sound in this same fluid. Controlling and limiting the speed of the space plane 10 is additionally necessary in order to guarantee acceptable loading levels on the passengers, which means to say loading levels preferably of below 2 g, a value that is still comfortable. The flaps 11 perform these functions of controlling and limiting the speed when the space plane 10 is in the nose-down dive phase.

The flaps 11 constitute airbrakes which are used to control and limit the speed V and the stability of the space plane 10 during its space descent. They may also be used for braking upon landing and also for energy management in the final approach phase, just like conventional airbrakes.

Here used as airbrakes in the space domain, the flaps 11 are designed to withstand the conditions of subsonic flow. Flow around an obstacle is subsonic when the Mach number is below the critical Mach number that corresponds to the onset of a shockwave. The dynamic conditions differ appreciably from the conditions for which airbrakes intended for the approach phase are usually designed. Specifically, the space descent phase, FIG. 2, is intended to bring the space plane 10 down to an altitude of around 15 km (50 000 feet) with a Mach number of below 0.6 and notably of between 0.5 and 0.55 and a dynamic pressure of below 3000 Pa and preferably of 2000 to 2500 Pa, it being possible for these values to vary according to the mission.

At the end of the nose-down maneuver of the space plane 10, and therefore during the second phase of space descent, FIG. 3, and during the return of the space plane to aeronautical operation, FIG. 4, the space plane is at an altitude of around 11 km, with a Mach number lower than the critical Mach number, namely 0.9 and preferably from 0.6 to 0.7. The maxima reached during the transition from the space domain to the aeronautical domain have a Mach number of around 0.8 to 0.85 and a dynamic pressure of between 7000 and 10 000 Pa. These Figures are given purely by way of indication and may of course vary according to the mission. By way of comparison, on landing, the dynamic pressure is around 5 000 Pa and the speed is of the order of Mach 0.2 to 0.3, which is appreciably lower.

To sum up, according to the disclosed embodiment, the transition from the space domain to the aeronautical domain involves:

- a first step of aircraft descent, which aircraft 10 has a speed V that is practically vertical while its attitude is substantially horizontal and therefore with high incidence I, during which step the pitch-attitude control surfaces 12 of the aircraft are lowered more or less parallel to the eye of the relative wind;
- a second step in which the aircraft effects a nose-down dive by means of a straightening of the pitch-attitude control surfaces 12, the speed V of the space plane remaining practically vertical and the incidence I of the aircraft therefore being reduced, the speed of the aircraft in this step being reduced and stabilized by opening the flaps 11 to a greater or lesser extent;
- a third step for which the craft resumes aeronautical operation, the speed V becoming horizontal and the craft therefore flying at low incidence I, this step being achieved by lowering the pitch-attitude control surfaces 12 and closing the flaps 11.

Because the flaps/airbrakes 11 are rated in relation to the space descent phase, they have a fairly considerable mass. Thus, in the advantageous aspect described, they are given a second function: when the space plane 10 is not in a transition phase making the transition between the space mode and the aeronautical mode, the airbrakes 11 also act as landing gear doors. They remain closed to limit aerodynamic drag and to protect the landing gears.

To ensure success in the maneuver making the transition from the space domain, FIG. 2, to the aeronautical domain, FIG. 4, the flaps 11 are placed on the pressure face side 50 of the wing structure 15 under the lift-generating surface of the aircraft. They can thus be used to adjust drag, without disrupting controllability, and with the least possible impact on the lift C of the aircraft. In order to limit the impact on the lift C still further, the airbrakes 11 are possibly situated on the fuselage 17 in the region of the landing gear doors in the soft belly 51.

According to the aspect, the flaps are also landing gear doors.

In this case, the flaps can advantageously be maneuvered according to the phases of flight independently of the landing gears or in conjunction with the landing gears.

When the airbrake device/landing gear doors 11 can be completely dissociated from the landing gears throughout the flight, the actuators are rated to open the airbrakes to the angle necessary for controlling the drag in the space descent phase, and also to allow the landing gear doors to be fully opened in order to lower the landing gears. Because the airbrakes/landing gear doors are dissociated from the landing gears, in order to reduce the emission of noise on landing for example, the landing gear doors can be closed again when the landing gears have been lowered.

Coupling and uncoupling the airbrakes/landing gear doors 11 with respect to the landing gears according to the phases of flight is also possible. Thus, in the space descent phase, the doors are connected to the airbrake actuators and disconnected from the actuators common to the landing gears. Conversely, during the landing phase, the landing gear doors are connected to the landing gear actuators and are disconnected from the airbrake actuators.

The airbrakes/landing gear doors assembly may potentially pivot about different axes, perpendicular to the direction of flight or parallel to the direction of flight, according to the phase of flight and the airbrake and landing gear door functions performed in these various phases of flight by pivoting about the desired axis. Thus, the flaps 11' when used as airbrakes pivot about the axis perpendicular to the airplane axis A and when they operate as landing gear doors to open the landing gear bays, as depicted in FIG. 5, the flaps 11' pivot about axes parallel to the main axis of the craft so as to reduce the drag caused by opening them in this phase of flight.

The disclosed embodiment is not restricted to the aspects depicted and notably the number of flaps may be two, four or more in order to balance the braking during the space descent.

What is claimed is:

1. A space aircraft suited to aeronautical flight, comprising a body and a first wing structure defining a lift-generating surface and attitude-control means, where said control means comprise one or more flaps positioned under the lift-generating surface and that can be maneuvered between a retracted position and an inclined, deployed, aerodynamic-braking position during the transition of the craft from a phase of space flight to a phase of aeronautical flight, and wherein the one or more flaps comprise a first axis of maneuvering for opening the one or more flaps against incoming airstream, and a second axis of maneuvering for opening the flap or flaps parallel to incoming airstream.

2. The space aircraft as claimed in claim 1, wherein the flap or flaps are suited to deployment at controllable variable inclinations.

3. The space aircraft as claimed in claim 1, comprising at least one pair of flaps which are positioned on either side of a longitudinal axis of the craft.

4. The space aircraft as claimed in claim 3, wherein the flaps are suited to being controlled independently of one another so as to control the descent of the craft.

5. The space aircraft as claimed in claim 1, wherein all or some of the flaps are airbrake devices or landing gear doors.

6. The space aircraft as claimed in claim 5, wherein the flaps can be maneuvered according to the phases of flight independently of landing gears or in conjunction with landing gears.

7. The space aircraft as claimed in claim 5, wherein the airbrake flaps or landing gear doors are maneuvered by actuators rated to allow the airbrakes to be opened partially during the transition between space descent and aeronautical descent and to allow the landing gear doors to be opened fully for landing, the actuators being suited to opening the flaps in a way that can be altered according to the phase of flight.

8. The space aircraft as claimed in claim 1, wherein the attitude-control means comprises pitch-attitude control surfaces.

9. The space aircraft as claimed in claim 8, wherein a second wing structure comprises pitch-attitude control surfaces.

10. A method for controlling the speed of an aircraft as claimed in claim 1, during a descent phase of the aircraft with transition of the aircraft from a phase of space flight to a phase of aeronautical flight, this descent phase comprising:
a first step of parabolical descent of the aircraft, the aircraft being in a position of high incidence;
a second step of bringing the craft into a nose-down position; and
a third step of the aircraft flattening out in aerodynamic flight at low incidence;
wherein control of the speed of the aircraft is achieved in the second step by means of the opening of said flaps.

11. The method as claimed in claim 10, wherein the high-incidence position is defined by an angle greater than 40° between the longitudinal axis and the speed axis of the craft.

12. The method as claimed in claim 10, wherein the control of the speed of the aircraft by the opening of said flaps is begun during the first step.

13. The method as claimed in claim 10, wherein, with the means of controlling the attitude of the aircraft comprising pitch-attitude control surfaces, these are angled so as to apply a nose-up moment to the aircraft during the first step.

14. The method as claimed in claim 13, wherein the transition from the first to the second step occurs through the straightening of the pitch-attitude control surfaces, the opening of the flaps controlling the speed of the aircraft.

15. The method as claimed in claim 14, wherein, with the aircraft having created lift at the end of the second step, the flattening-out step is performed by angling the pitch-attitude control surfaces in such a way as to apply a nose-up moment to the aircraft, the flaps then being closed again.

16. The method as claimed in claim 10, for controlling the speed of an aircraft of the space plane type, comprising landing gear doors suited to operating as airbrakes, from a phase of suborbital space flight to a phase of aeronautical flight, characterized in that the transition from the space domain to the aeronautical domain involves:
a first step of angling the pitch-attitude control surfaces in such a way as to apply a nose-up moment to the space plane, the space plane having a speed V that is practically vertical with high incidence I, the space plane being kept substantially horizontal;
a second step of opening the landing gear doors and of straightening the pitch-attitude control surface, the space plane thus being brought into a nose-down configuration, the speed V of the space plane being practically vertical with low incidence I;
a third step of angling the pitch-attitude control surfaces in such a way as to apply a nose-up moment to the space plane and of closing the landing gear doors, for which step the space plane reverts to aeronautical operation, the space plane and the speed V being returned to the horizontal, the aircraft being at a low incidence I.

* * * * *